United States Patent [19]

Japenga

[11] 3,814,866

[45] June 4, 1974

[54] NEGATIVE RESISTANCE REPEATER

[75] Inventor: Ronald Japenga, Glendale Heights, Ill.

[73] Assignee: Reliable Electric Company, Franklin Park, Ill.

[22] Filed: Sept. 30, 1971

[21] Appl. No.: 185,167

[52] U.S. Cl. .............. 179/170 G, 333/80 R, 333/77

[51] Int. Cl. .............. H04b 3/36, H04b 3/16

[58] Field of Search .............. 179/170, 170 G, 170 T, 179/170 R; 331/141; 333/80, 80 R, 80 T, 77, 78

[56] References Cited

UNITED STATES PATENTS

| | | | |
|---|---|---|---|
| 2,878,325 | 3/1959 | Merrill | 179/170 G |
| 2,998,581 | 8/1961 | Dimmer | 179/170 G |
| 3,042,759 | 7/1962 | Bonner | 179/170 G |
| 3,068,329 | 12/1962 | De Monte | 179/170 G |
| 3,562,659 | 2/1971 | Kulas | 331/141 |
| 3,562,678 | 2/1971 | Antoniou | 333/80 |
| 3,566,046 | 2/1971 | McCormick et al. | 179/170 R |
| 3,571,753 | 3/1971 | Saunders | 333/80 T |
| 3,716,680 | 2/1973 | Lim | 179/170 G |
| 3,767,861 | 10/1973 | Dimmer | 179/170 G |

*Primary Examiner*—William C. Cooper
*Assistant Examiner*—Alan Faber
*Attorney, Agent, or Firm*—Olson, Trexler, Wolters, Bushnell & Fosse

[57] ABSTRACT

A negative resistance repeater is provided with a coupling transformer to be connected to communication lines for sensing the impedance of the lines and altering the matching impedance characteristic of the lines in accordance with communication signals being transmitted over the lines. Series and shunt negative resistance repeaters utilize operational amplifier circuits having a single output terminal with first and second input terminals. The operational amplifier develops both the positive and negative feedback signals from the single output terminal of the amplifier.

3 Claims, 1 Drawing Figure

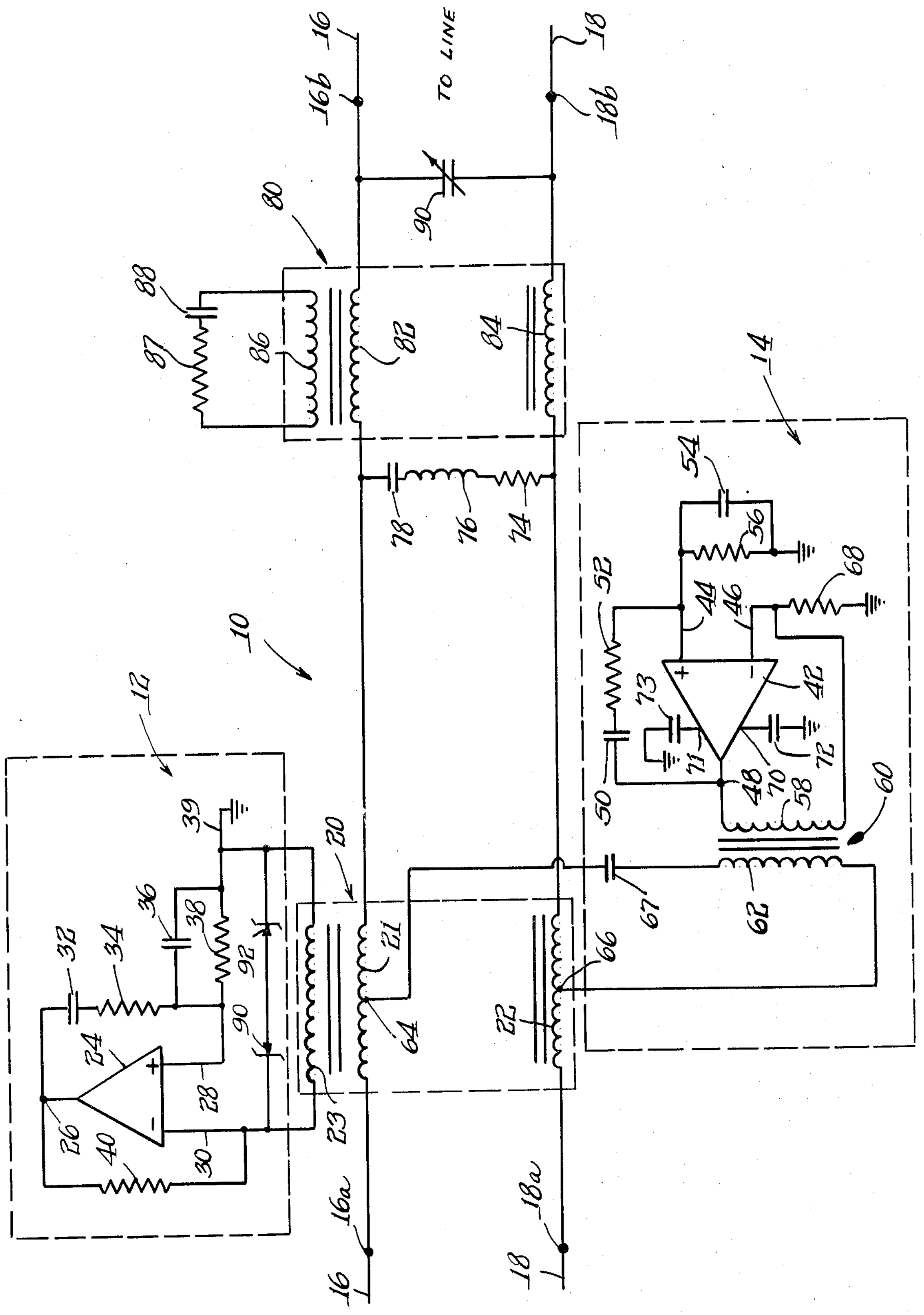
TO LINE

NEGATIVE RESISTANCE REPEATER

BACKGROUND OF THE INVENTION

This invention relates generally to negative impedance circuits and more particularly to circuits employing negative impedance converters for connection to telephone communication lines.

Positive feedback type negative resistance repeaters are well-known in the art for use in communication lines such as telephone lines. The negative impedance type of repeater has been in wide use for many years and has proven its worth in telephone communication apparatus. This type of negative impedance repeater is essentially a device which, instead of amplifying a signal in the usual sense of the word, causes a negative impedance to be placed in series with the telephone communication line to improve the current carrying capabilities of the line for voice signals. The effect obtained with this type of negative resistance repeater is to cancel an equal positive impedance naturally inherent in the line to raise the transmission level of the line for aduio signals. This type of negative resistance repeater is commonly referred to as the series negative resistance repeater, the series terminology being descriptive of the manner in which the repeater is connected into circuit with the communication lines. A shunt type of negative resistance repeater was introduced and connected into the communication lines at a later date to eliminate some of the undesirable effects caused by the series repeater. The undesirable effects are primarily the mismatches in impedance that occur between the sending and receiving loads. With both series and shunt types of repeaters connected to a pair of communication lines signal losses that occur because of impedance mismatch are completely eliminated, this being particularly true over long distance communication lines.

While the first types of negative impedance repeaters utilized vacuum tubes as an active element in their circuits, they were ultimately replaced with the equivalent transistor circuit as transistor technology improved. However, the transistor circuits of the prior art have substantially the same circuit configuration as their vacuum tube predecessors. That is, negative resistance repeaters for the most part have feedback paths, either negative feedback or positive feedback paths, connected to separate inputs of the repeater circuit. In all instances such feedback signals, both negative and positive, are derived from separate vacuum tube outputs or transistor output terminals. If both the positive and negative signals are not derived from corresponding opposite current controlled devices, i.e., tubes or transistors, then they are developed at distinctly separate circuit points. When feedback signals are developed at separate circuit points or at the output of different tubes or transistors there is the inherent possibility that aging of components will cause different levels of the positive and negative feedback signals to be obtained thus causing a corresponding off-balance of the amplifier circuits within the negative resistance repeater. The gradual aging of components is not readily detectable in a single repeater circuit but, upon utilizing a large number of repeater circuits at spaced locations along a long distance communication line the net effect of component deterioration or aging may cause poor quality of communication.

SUMMARY OF THE INVENTION

Accordingly, it is an object of this invention to provide an improved negative resistance repeater circuit for use in telephone communication lines.

Another object of this invention is to provide an improved negative resistance repeater circuit which has two feedback paths originating from a single output terminal of an amplifier with the two feedback paths providing opposite polarity feedback signals.

Another object of this invention is to provide an improved negative resistance repeater circuit which utilizes operational amplifiers as the active element and wherein a common output terminal of the operational amplifier provides two feedback signals to respective first and second input terminals of the operational amplifier and wherein the common feedback signals have effective opposite polarities.

Briefly, the negative resistance repeater circuit arrangement of this invention includes coupling means in the form of a three winding coupling transformer with two of the windings arranged for connection to a pair of communication lines. The two windings are connected in series with the lines to sense the impedance of the line in accordance with the signals passing over the lines. The negative resistance repeater circuit arrangement includes first and second negative resistance repeaters, one being a series repeater and the other being a shunt repeater. The series repeater arrangement includes an operational amplifier which has a single output terminal and a pair of input terminals. One of the input terminals thereof is connected to one side of the third winding of the coupling transformer to develop negative impedance characteristics therein which, in turn, is transformer coupled into the other two windings which are connected in series with the communication lines. The input terminal to which the third winding of the coupling transformer is connected is an inverting input terminal, this being characteristic of 180° phase shift through the operational amplifier and is considered the negative feedback. Positive feedback from the output terminal of the operational amplifier is delivered through a resistance-capacitance network to a non-inverting input terminal which provides no phase shift between the input and output signals.

A second negative resistance repeater, commonly referred to as the shunt repeater, is connected to the coupling transformer by having taps on the two windings of the transformer that are connected in series with the communication lines. These taps are then coupled to a secondary winding of a transformer associated with the shunt repeater. This transformer has its primary winding coupled between the single output terminal of a second operational amplifier and its first inverting input terminal and also serves as the negative feedback path. A second feedback path is provided between the output of the second operational amplifier and its non-inverting input, this being the positive feedback path. In this shunt repeater circuit arrangement the negative resistance developed at the output of the operational amplifier is then transformer coupled through its associated transformer and delivered into the communication lines by the taps on the series associated transformer windings.

In both the series and shunt negative resistance repeaters the operational amplifiers used have but a single output terminal from which the two feedback signals of effective opposite polarity are derived.

When both the series and shunt repeater circuits of this invention are incorporated in a single negative resistance repeater circuit arrangement, there is also provided a frequency band pass filter circuit formed by series and shunt circuit components comprising resistance-capacitance and inductance. This may include a second three winding transformer with two of the windings connected in series with the transmission lines and the third winding connected in a closed loop circuit through a resistor and capacitor. Also, a variable capacitor may be connected in shunt relation with the transmission line to vary the high frequency signal elimination capabilities.

BRIEF DESCRIPTION OF THE DRAWING

The single FIGURE illustrates a schematic diagram of a negative resistance repeater circuit arrangement utilizing two negative resistance repeater circuits constructed in accordance with the principles of this invention.

DESCRIPTION OF THE ILLUSTRATED EMBODIMENT

Referring now to the drawing, the negative resistance repeater circuit arrangement of this invention is designated generally by reference numeral 10 and includes a pair of repeater circuits 12 and 14 constructed in accordance with the principles of this invention. The repeater circuit 12 is commonly referred to as a series repeater while the repeater 14 is commonly referred to as a shunt repeater. This designation, series or shunt, corresponds to the manner in which the repeaters are connected in circuit with a pair of transmission communication lines 16 and 18. The communication lines 16 and 18 preferably are telephone communication lines or the like over which audio signal information is transmitted and wherein the negative resistance circuit arrangement 10 is connected to the lines 16 and 18 by means of terminals 16a, 16b, 18a and 18b to increase signal gain of voice communications. The series negative resistance repeater 12 is connected to the transmission lines 16 and 18 by coupling means preferably in the form of a three winding transformer 20 having two of its windings 21 and 22 in direct series connection with lines 16 and 18, respectively, and a third transformer winding 23 coupled to the windings 21 and 22 for receiving signals from the transmission lines 16 and 18 and delivering these signals into the series repeater 12. This will cause impedance characteristic changes to be fed back into the transmission lines.

Most advantageously, the negative resistance repeater 12 includes an operational amplifier 24 as the active element in the circuit. The operational amplifier 24 has a single output terminal 26 thereof connected back to a pair of input terminals 28 and 30 to control the impedance characteristic change sensed in the transformer winding 23. Input terminal 28 of the operational amplifier 24 receives an effective positive feedback signal through a capacitor 32 and resistor 34 connected in series therewith and an associated resistor-capacitor network formed by capacitor 36 and resistor 38 connected to ground potential through a line 39. This circuit arrangement is solely a feedback path for applying a positive signal back to the non-inverting input of the operational amplifier. Therefore, a positive going signal at the input 28 will produce a positive going signal at the output terminal 26. On the other hand, the input terminal 30 is an inverting input which will produce a negative going output signal at terminal 26 upon sensing a positive going input signal. The feedback to input terminal 30 is achieved through a resistor 40, the value of which is selected to provide proper gain of the operational amplifier and to provide proper feedback control for the series connected negative resistance repeater 12.

In operation, a controlled amount of positive feedback from output terminal 26 is fed to the non-inverting input terminal 28 by means of the resistance-capacitance network of resistors 34 and 38 and capacitors 32 and 36. However, the net gain achieved by the negative resistance repeater circuit 12 is determined by the negative feedback signal through the gain resistor 40 to the input terminal 30, this being the inverting input. The negative impedance sensed between the inverting input 30 and ground potential is then coupled to the transmission lines 16 and 18 by the coupling transformer 20, this coupling being achieved through magnetic coupling of the two secondary windings 21 and 22 with that of the primary or signal winding 23. In order to obtain a balance on the line, half of the negative impedance is coupled into one side of the line and the other half is coupled into the other side of the line, these two sides of the line corresponding to a tip side and a ring side. Therefore, the net negative impedance is in series with the line and lowers the line impedance from either direction and is therefore a bidirectional impedance control.

Resistors 34 and 38 are selected to have a resistance value for proper feedback signal development. However, the resistance value of resistor 40 is determined by the values of resistors 34 and 38 to give a particular midband impedance characteristic of the particular band pass frequencies passing through the repeater. Also, the ratio of these resistors determines the closed loop gain of the operational amplifier. For example, resistor 38 should be as close in value to that of resistor 40 in parallel with the DC resistance of winding 23 of the transformer 20. However, resistor 38 must be large enough to prevent excessive power dissipation in the operational amplifier while also providing the proper time constant with capacitor 32 for proper operation.

The capacitor 32 is utilized to block positive DC feedback from the output terminal 26 and to provide low frequency stability of the audio signals being utilized within the circuit. To insure this low frequency stability it is necessary that the impedance seen looking back into the line be greater than the negative impedance seen looking into the operational amplifier input. Therefore, capacitor 32 must be small enough to insure this condition, the value being in the order of between one and three microfarads. It would also be possible to insure stability of this feedback network by placing an inductor in parallel with the gain resistor 40. Capacitor 36 is utilized to determine the high frequency stability of the negative resistance repeater by reducing the amount of positive feedback at the high undesired frequencies.

The shunt repeater circuit 14 includes an operational amplifier 42 having input terminals 44 and 46 and a single output terminal 48. Output terminal 48 provides common feedback signals, both the effective negative feedback and effective positive feedback signals, to the input terminals 44 and 48, respectively. However, in this instance the negative feedback signal is delivered through a primary winding 58 of a transformer 60. The positive feedback signal is applied through a capacitor 50 and series resistor 52 similar to that as described above with regard to operational amplifier 24. That is, the positive feedback signal to input terminal 44 is developed across resistor 56 and capacitor 54. However, the negative feedback signal from transformer winding 58 is developed across a gain control resistor 68, the value of which is selected in accordance with the value of resistors 52 and 56.

The coupling transformer 60 has its secondary winding 62 coupled to taps 64 and 66 on the transformer windings 21 and 22, respectively. The secondary winding 62 is connected in series with a capacitor 67 and together therewith forms a shunt connection across the lines 16 and 18 to compensate for mismatches in impedance over the transmission lines which may occur as the result of the negative resistance repeater 12.

In operation, the negative resistance repeater 14 is very similar to that of the negative resistance repeater 12. Positive feedback signals are delivered from the single output 48 to the non-inverting input terminal 44 through the capacitor 50 and resistor 52. The gain of the repeater circuit 14 is determined by the resistance value of the gain resistor 68 which has one end thereof connected to the input terminal 46 and one side of the primary winding 58 while the other end of resistor 68 is connected to ground potential. The negative impedance developed between the single output terminal 48 and the inverting input terminal 46 is then coupled through the primary winding 58 of transformer 60 to appear as a shunt signal across the transmission lines 16 and 18. Since the impedance so coupled to the transmission lines is of a negative characteristic, i.e., (Z + 180°) then current flows into the line with the net effect of bilateral gain. The capacitor 67 serves as the blocking capacitor to prevent short circuiting of the DC loop current across the transmission lines. Capacitor 67 is selected to have a value low enough to have a negligible effect on the dial pulses which form the caller's code signal.

The operational amplifiers 24 and 42 can be separate circuit components or can be formed in a single integrated circuit and in a single container such as that purchased from Motorola under Part No. MC 1458 which is a linear integrated circuit.

The component values of the circuit arrangement illustrated herein are listed below. These values are only exemplary in that they represent the optimum circuit arrangement while other values and modifications may be incorporated.

| Component | Value |
|---|---|
| Resistor 34 | 1K ohm |
| Resistor 38 | 1K ohm |
| Resistor 40 | Determined by resistors 34 and 38 and DC resistance of winding 23 |
| Resistor 52 | 1K ohm |
| Resistor 56 | 1K ohm |
| Resistor 68 | Same as resistor 40 |
| Capacitor 32 | 2.2 microfarads |
| Capacitor 36 | 0.002 microfarads |
| Capacitor 50 | 0.2 microfarads |
| Capacitor 54 | 0.022 microfarads |
| Capacitor 67 | 0.26 microfarads |

By utilizing operational amplifiers on a common integrated circuit as mentioned above, a simplified power supply connection can be obtained. For example, a single pair of power terminals 70 and 71 can supply power to both the operational amplifiers 24 and 42. In this instance, filtering capacitors 72 and 73 are connected to terminals 70 and 71, respectively, and to the common power supply, not shown, to insure stable operation of the circuit. The power supply utilized can be any conventional power supply arrangement having positive and negative voltages in the order of 18 volts above and below ground potential.

The negative resistance repeater circuit arrangement 10 of this invention may also include a frequency band pass circuit arrangement connected across the lines 16 and 18 which is formed of a resistor 74 connected in series with an inductance element 76 which, in turn, is connected to a capacitor 78. Also connected to the transmission lines is a second transformer 80 which has a pair of windings 82 and 84 connected in series with the lines 16 and 18, respectively, and a third winding 86 in closed loop circuit connection with resistor 87 and capacitor 88. An adjustable capacitor 90 shunts the lines 16 and 18. This circuit arrangement then provides frequency selectivity for the negative resistance repeater circuit arrangement 10. For example, for voice communication over the transmission lines 16 and 18 it is necessary only to provide signal gain for frequencies in the order of 200 to 2,000 cycles.

To limit the amount of negative resistance that can be obtained by the repeater circuit 12, a pair of back-to-back zener diodes 90 and 92 are connected from the input terminal 30 to ground. These zener diodes will shunt both positive and negative going signals above a given voltage level.

Accordingly, what has been described is a simple and inexpensive negative resistance repeater arrangement which utilizes a pair of negative resistance repeater circuits each having a single active output terminal whereat both negative and positive feedback signals are developed to be supplied to separate inputs of their associated operational amplifiers. Accordingly, variations and modifications of this invention may be effected without departing from the spirit and scope of the novel concepts disclosed and claimed herein.

The invention is claimed as follows:

1. A negative impedance repeater arrangement for connection to communication lines comprising, coupling means arranged for connection to the communication lines to sense the impedance of the line in accordance with the signals passing over the communication lines, a series repeater connected to said coupling means, said series repeater including first operational amplifier means having first and second input terminals and a first single output terminal, said first and second input terminals being noninverting and inverting inputs respectively of said amplifier means with respect to said first single output terminal, said second input terminal being connected to said coupling means, a first feedback circuit connected between said first single output terminal and said first input terminal, said first feedback circuit including a series capacitor, a second feedback circuit connected between said first single output terminal and said second input terminal, the negative impedance sensed at said second input terminal being coupled into the communication lines by said coupling means, a shunt repeater connected to said coupling means, said shunt repeater including second operational amplifier means having third and fourth input terminals and a second single output terminal, said third and fourth input terminals being noninverting and inverting inputs respectively of said amplifier means with respect to said second output terminal, said fourth input terminal being coupled to said coupling means, a third feedback circuit connected between said second single output terminal and said third input terminal, said third feedback circuit including a series capacitor, and a fourth feedback circuit connected between said second single output terminal and said fourth input terminal, and transformer means associated with said fourth feedback circuit to transformer couple the negative impedance developed within said second single output terminal into said coupling means.

2. The negative impedance repeater of claim 1 further including frequency responsive circuit means for connection in shunt relation with the communication lines for blocking undesired frequencies above and below a predetermined frequency band pass.

3. The negative impedance repeater of claim 2, wherein said frequency responsive circuit means includes a series circuit of a resistor, a capacitor and an inductor for connection across the communication lines, a second transformer means having first, second and third winding with said first and second windings arranged for connection in series with the separate communication lines and said third winding forming part of a closed loop circuit with a resistor and capacitor, and an adjustable capacitor for connection across the communication lines.

* * * * *